(12) United States Patent
Copeland (10) Patent No.: US 8,511,415 B1
(45) Date of Patent: Aug. 20, 2013

(54) VEHICLE PROPULSION SYSTEM

(76) Inventor: Henry Copeland, Montgomery, AL (US)

(*) Notice: Subject to any disclaimer, the term of this patent is extended or adjusted under 35 U.S.C. 154(b) by 262 days.

(21) Appl. No.: 12/932,197

(22) Filed: Feb. 22, 2011

(51) Int. Cl.
H02J 7/00 (2006.01)
B60L 11/18 (2006.01)

(52) U.S. Cl.
CPC .................. B60L 11/1837 (2013.01)
USPC ........................................................ 180/165

(58) Field of Classification Search
USPC ..................... 180/165, 65.1, 65.31
See application file for complete search history.

(56) References Cited

U.S. PATENT DOCUMENTS

| 4,217,526 | A | 8/1980 | Farr | |
| 5,180,023 | A | 1/1993 | Reimers | |
| 5,343,128 | A | 8/1994 | Beltrame et al. | |
| 5,583,418 | A * | 12/1996 | Honda et al. | 320/109 |
| 6,886,647 | B1 * | 5/2005 | Gotta | 180/65.1 |
| 7,061,153 | B1 * | 6/2006 | Foshage et al. | 310/180 |
| 7,293,621 | B2 | 11/2007 | Long | |
| 7,416,039 | B1 * | 8/2008 | Anderson et al. | 180/165 |
| 8,307,967 | B2 * | 11/2012 | Patwardhan | 191/2 |
| 8,324,858 | B2 * | 12/2012 | Hill et al. | 320/109 |
| 2010/0308601 | A1 * | 12/2010 | Walden | 290/1 R |
| 2012/0280656 | A1 * | 11/2012 | Bedell | 320/109 |

* cited by examiner

Primary Examiner — John R Olszewski
Assistant Examiner — Brian Cassidy
(74) Attorney, Agent, or Firm — Rodgers & Rodgers

(57) ABSTRACT

A vehicle propulsion system particularly adaptable for use in connection with golf carts which are driven over a charge station having a pair of elongated slots such that electrical pickups are lowered from the golf cart into engagement with electrically charged contact bars disposed within the slots thereby causing activation of a flywheel assembly to power the golf cart wheels.

3 Claims, 9 Drawing Sheets

VEHICLE PROPULSION SYSTEM

BACKGROUND OF THE INVENTION

In order to increase the pace of play, golf carts are used to quickly transport golfers around the course during the course of playing a typical round of 18 holes. Many of the golf carts utilize gasoline motors which naturally are an undesirable source of pollution. Battery-powered golf carts are also well known but suffer from the problem of the golf cart losing power during the course of a round of golf, thereby causing the player to be stranded usually a considerable distance from the clubhouse.

BRIEF SUMMARY OF THE INVENTION

The present invention is a propulsion system for vehicles which travel from point to point within a confined area and make periodic stops at fixed points along a given path of travel. Such vehicles include public transportation vehicles, personnel shuttle cars, tramcars, mail carts, golf carts and the like. By this invention, a vehicle propulsion system includes a charge station having contact bars disposed therein to transmit power to a vehicle disposed thereabove in order to rotate a flywheel. The flywheel is mounted on an axle shaft within a housing and by which power is transmitted through a transmission/differential to the vehicle wheels.

DETAILED DESCRIPTION OF THE INVENTION

With respect to the embodiment of the invention illustrated in FIG. 1, the propulsion system includes flywheel assembly 1, control assembly 2, control handle 3, drive assembly 4, pickup operator 5, electrical pickups 6, charge station 7, slots 8, contact bars 9, slot covers 10, supply conductors 11, power supply 12 and auxiliary power receptacle 13.

Figure 1A:
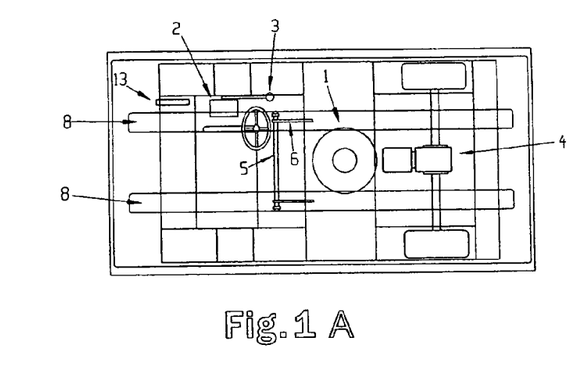
FIGS. 1A, 1B, 1C and 1D show the basic elements of the vehicle propulsion system according to this invention.
Figure 1B:
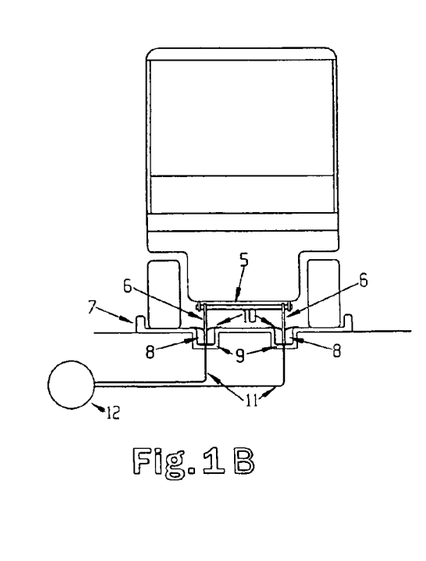
Figure 1C:
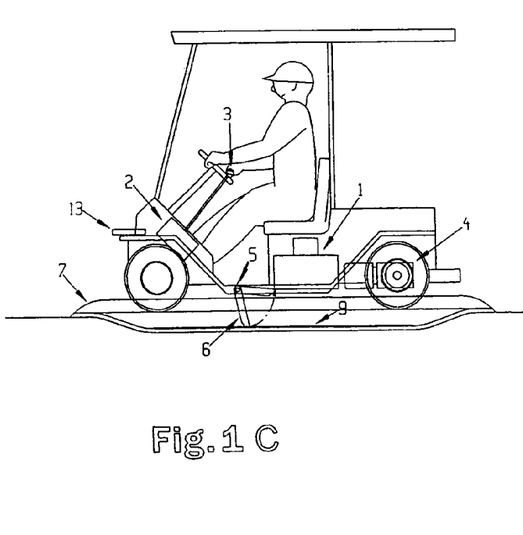
Figure 1D:
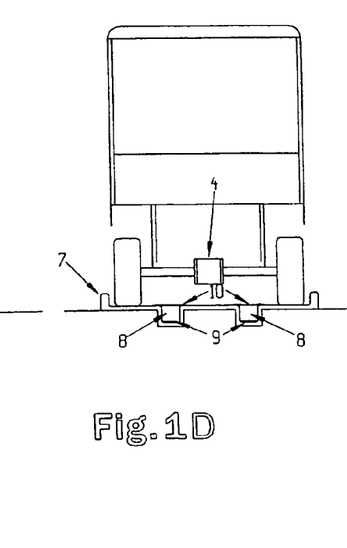
Figure 2:
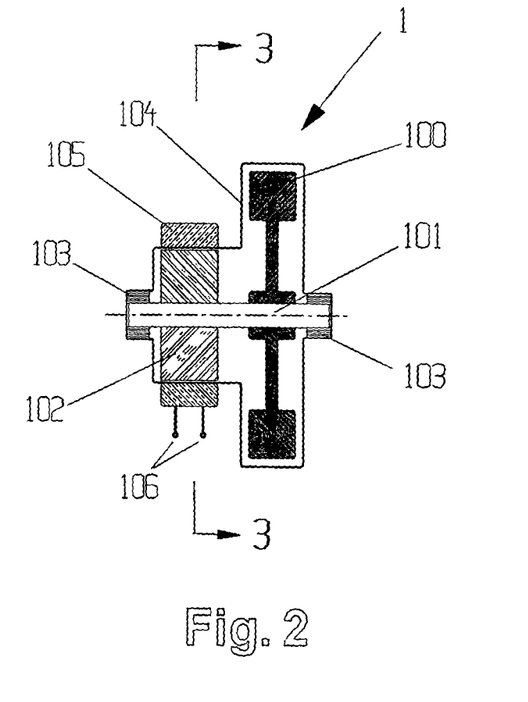
FIG. 2 is a cross-sectional view of the flywheel assembly.

Flywheel assembly 1, as shown in FIG. 2, includes flywheel 100 which, along with magnet assembly 102, is rigidly mounted on axle shaft 101 and is supported by bearings 103 all of which are enclosed in housing 104. Flywheel assembly 1 also includes coil assembly 105 and multiple coil leads 106. In certain embodiments of the invention, housing 104 may be atmospherically sealed with a vacuum created therein.

Figure 3:
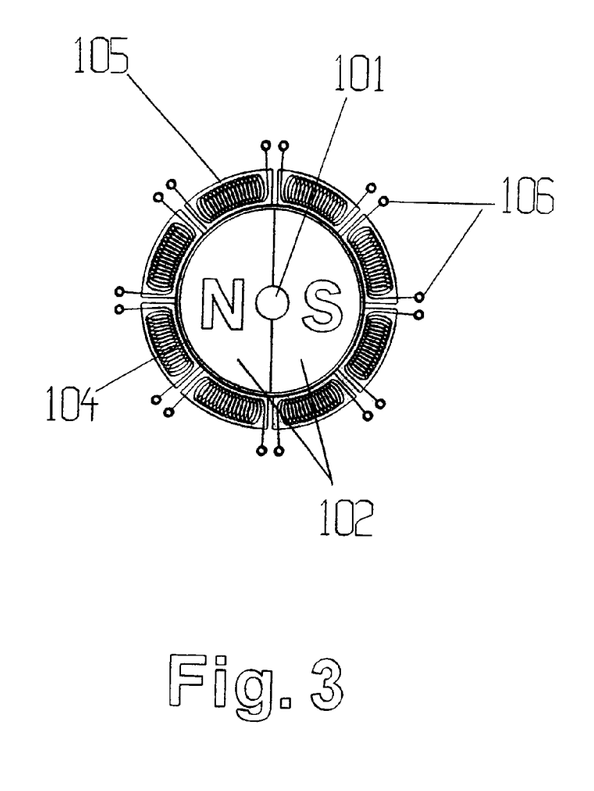
FIG. 3 is a cross-sectional view taken along the line 3-3 in FIG. 2.

As shown in FIG. 3, magnet assembly 102 includes two or more magnet segments of opposite polarity wherein the magnetic field generated by the magnets is of sufficient strength to penetrate housing 104 and coil assembly 105. This enables placement of coil assembly 105 outside housing 104 which removes the requirement for the penetration of housing 104 by coil leads 106 along with the requirement for associated seals between housing 104 and coil leads 106 if a vacuum is created in housing 104.

Figure 4:
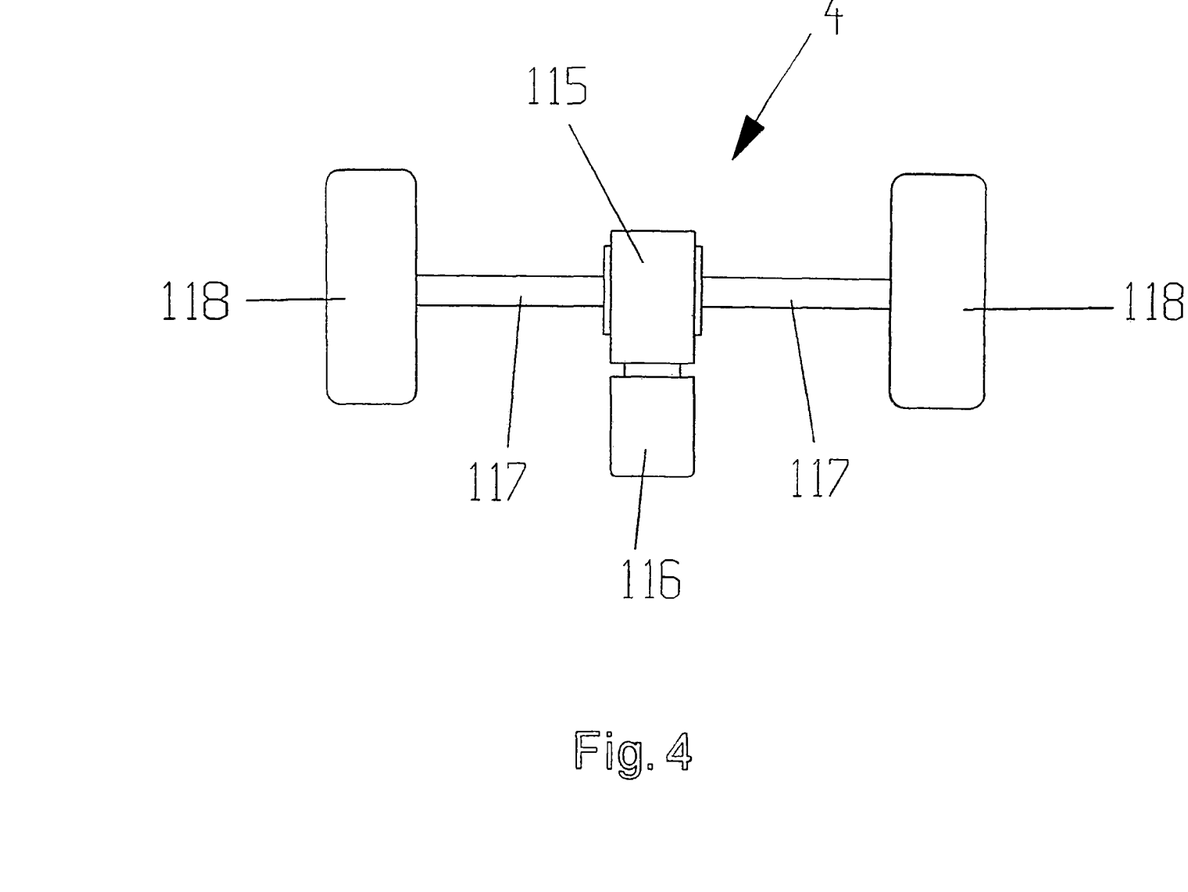
FIG. 4 is a schematic view of the vehicle drive assembly.

FIG. 4 depicts the elements which comprise drive assembly 4. More specifically, motor 116 drives transmission/differential 115 which transmits driving power through axles 117 to wheels 118. In other embodiments, motor 116 may be of such design that it is connected respectively in pairs directly to wheels 118.

Figure 5A:
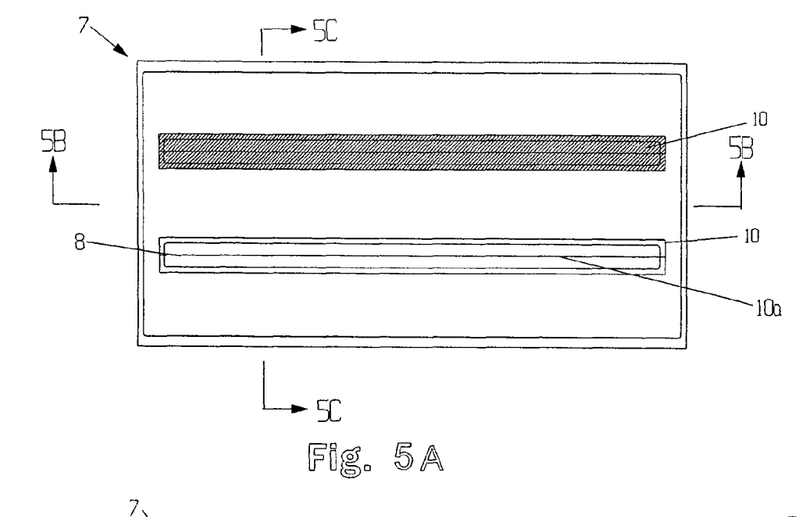
FIG. 5A is a top view of the vehicle charge station.
Figure 5B:
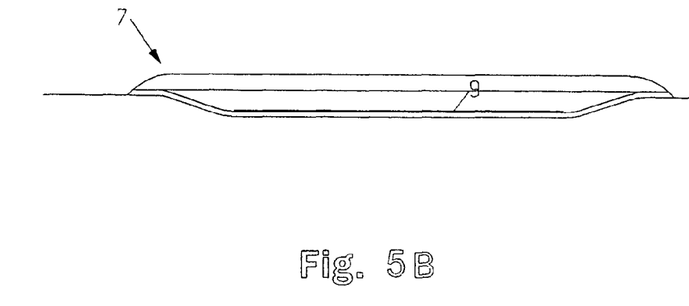
FIG. 5B is a view taken along the line 5B-5B in FIG. 5A.
Figure 5C:
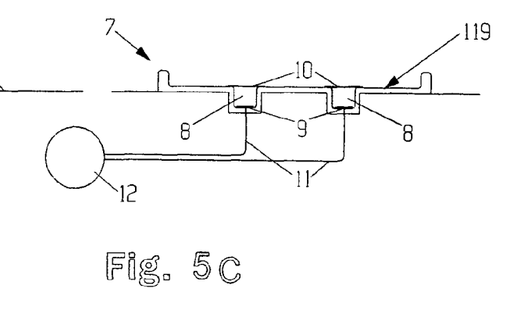
FIG. 5C is a view taken along the line 5C-5C in FIG. 5A.

FIGS. 5A, 5B and 5C show charge station 7 which includes ground pad 119 and has elongated slots 8 formed therein with contact bars 9 disposed on the bottom of generally U-shaped slots 8 and with slot covers 10 overlying slots 8. Slot covers 10 preclude human or animal contact with contact bars 9. Slot covers 10 are forcibly parted along slits 10a when electrical pickups 6 are moved over and into contact with contact bars 9. Conductors 11 transmit power from power supply 12 to contact bars 9 in known fashion.

Figure 6:
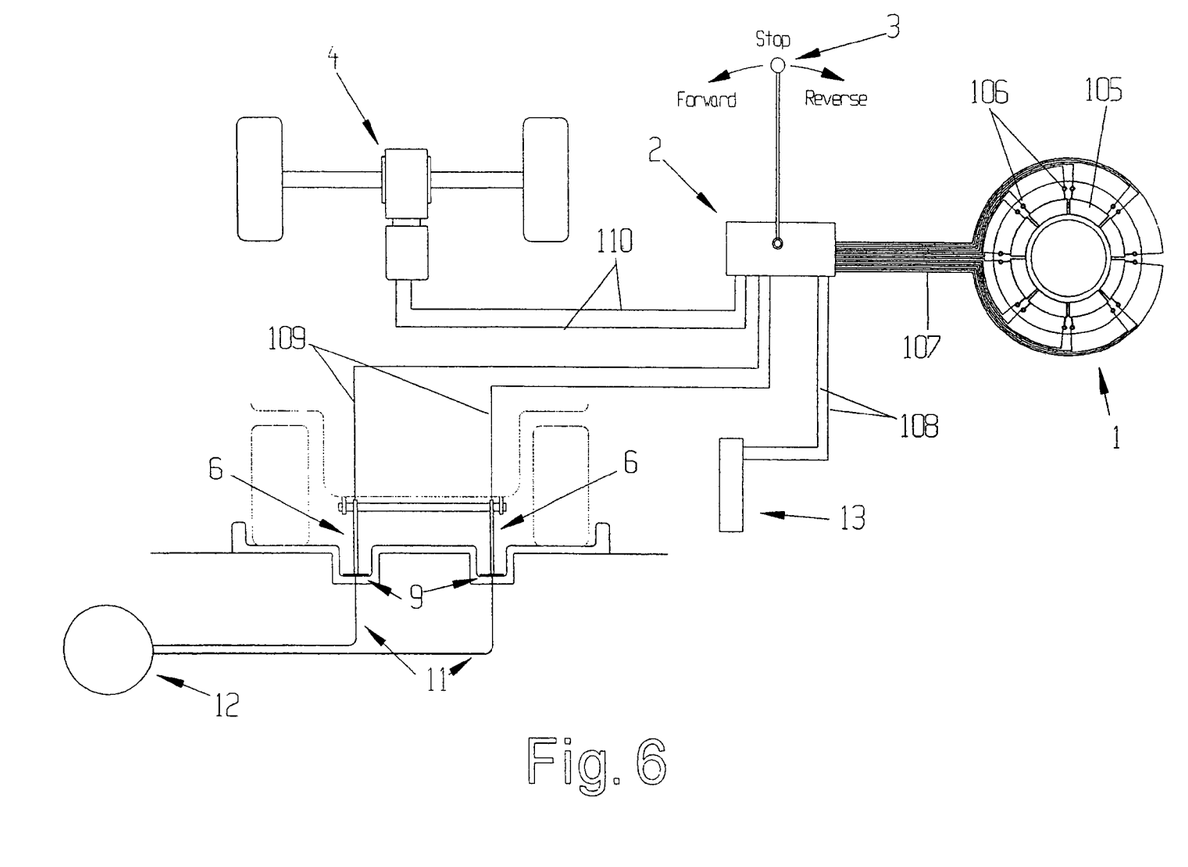
FIG. 6 is a schematic view of the vehicle wiring system.

FIG. 6 illustrates the wiring arrangement which connects the separate elements of the propulsion system wherein multiple strand harness 107 is provided with a pair of connecting wires for each coil assembly 105. In the system, two-wire harness 108 connects auxiliary power receptacle 13 to control assembly 2. Two-wire harness 109 connects electrical pickups 6 to control assembly 2 and two-wire harness 110 connects drive assembly 4 to control assembly 2. Finally, supply conductors 11 connect power supply 12, respectively, to contact bars 9.

Figure 7:
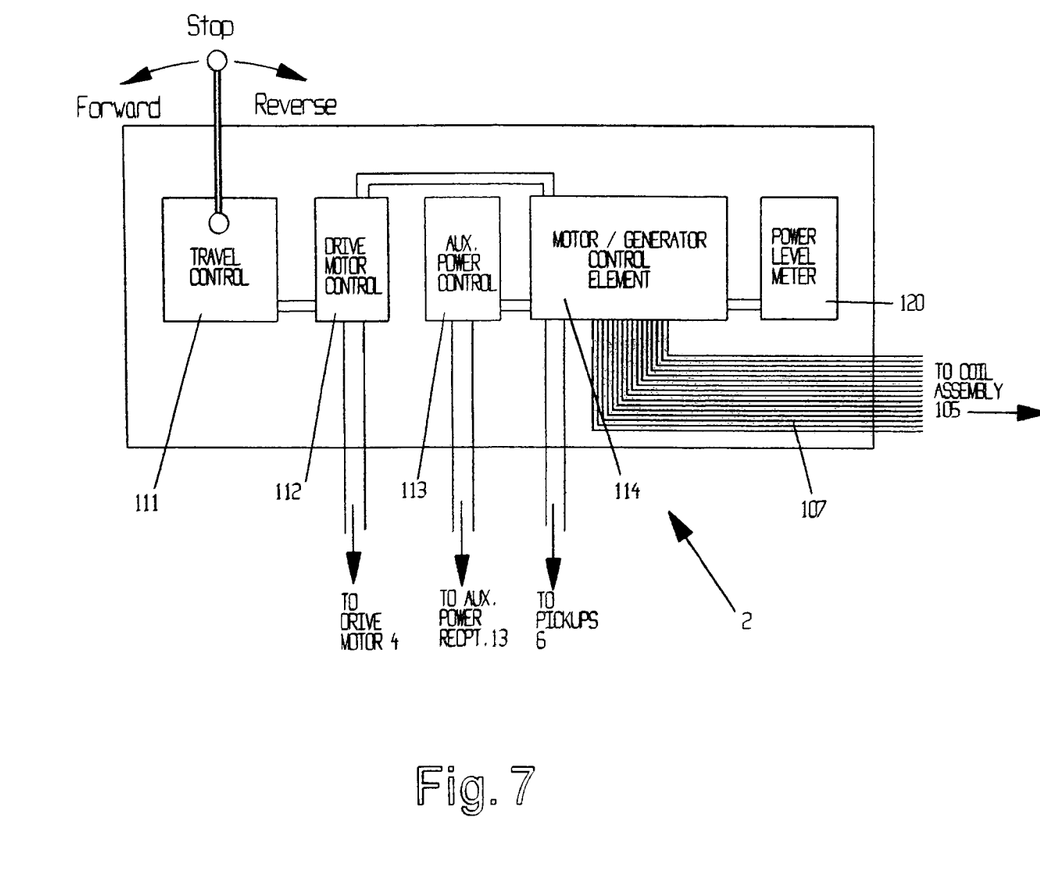
FIG. 7 is a block diagram of the vehicle control assembly.

FIG. 7 is a block diagram which shows elements of control assembly 2 and the interconnections between these elements and the other components of the propulsion system. All elements of control assembly 2 are commercially available products and are well known in the industry. Particular versions and sizes of these elements are selected to suit the desired embodiment of the invention.

More specifically, motor/generator control element 114 connects coil assemblies 105 for advantageous use of flywheel assembly 1 as a motor or as a generator. Motor/generator control element 114 also connects pickups 6 and auxiliary power receptacle 13 inputs to flywheel assembly 1. Auxiliary power control 113 modulates and controls the flow of power from auxiliary supply 121 to flywheel assembly 1. Travel control 111 supplies a forward, stop and reverse control signal to drive motor control 112, as selected by the positioning of control handle 3. Power level meter 120 is a tachometer which thereby indicates the rotational speed of flywheel 100 which indicates the energy level of flywheel 100 and the useful power available for propulsion of the vehicle.

Figure 8:
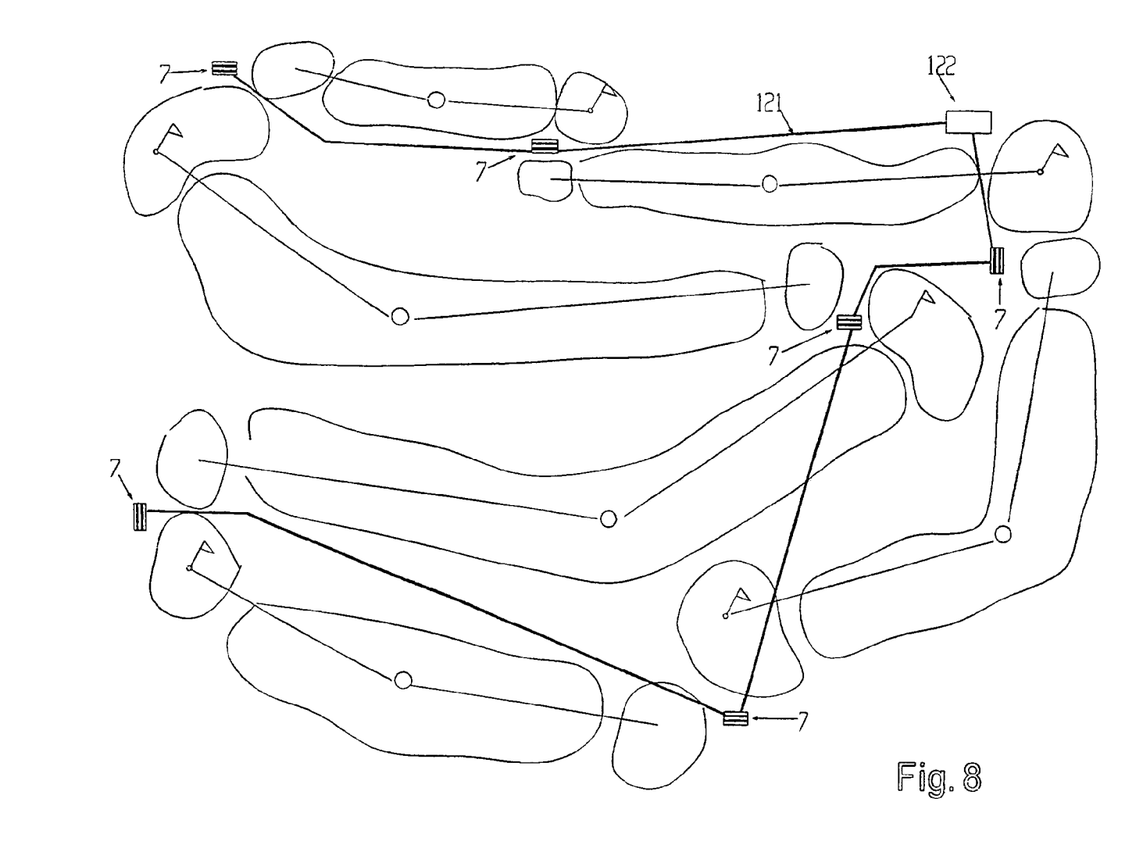
FIG. 8 is an overall view of the vehicle propulsion system used on a typical golf course.

In FIG. 8, the application of the invention as a propulsion system for a golf cart is shown. Charge stations 7 are located on a golf course at advantageous positions in close proximity to tee areas. Underground electrical conductors 11 transmit power from power supply 12 to charge stations 7.

Figure 9:
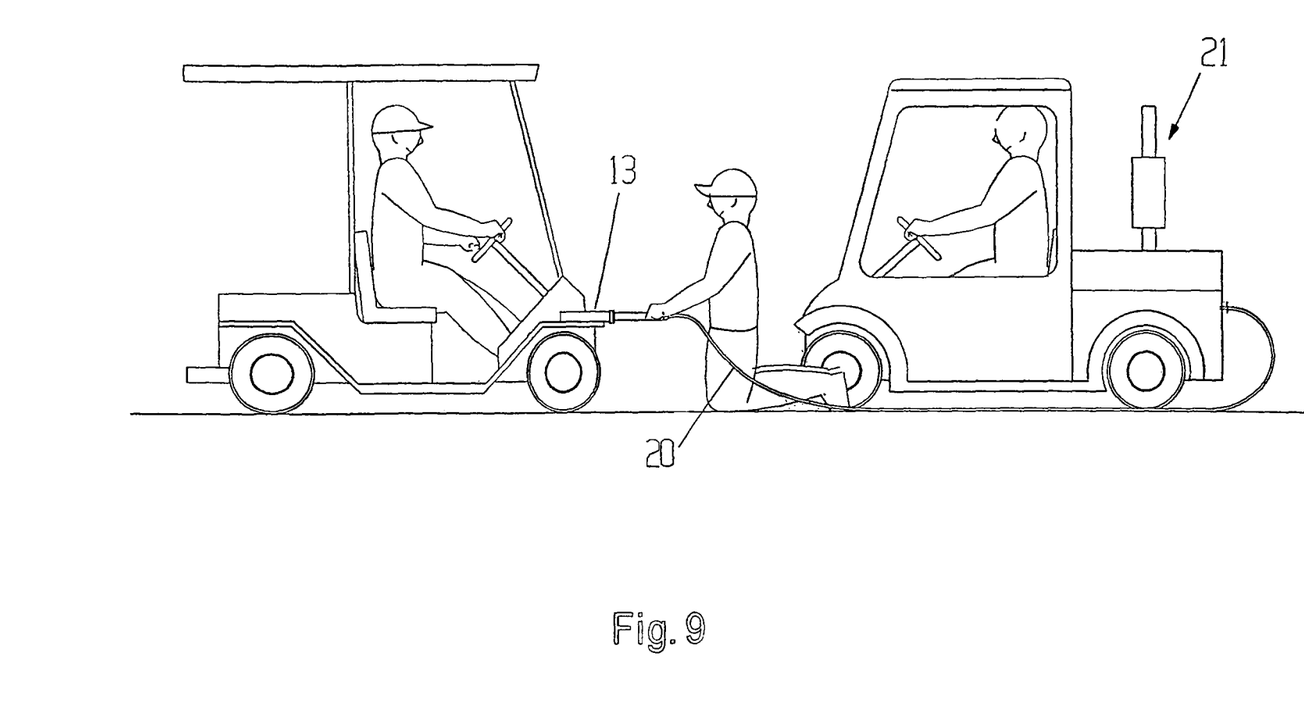
FIG. 9 is an elevational view showing the auxiliary power source according to this invention.

FIG. 9 depicts an auxiliary power source 21 which, in this example, is a portable generator mounted on a service vehicle. Power is transmitted from auxiliary power source 21 to auxiliary power receptacle 13 by means of electrical cable 20.

In operation, flywheel 100 is rotated by magnet assembly 102 when coil assembly 105 is configured as a motor. Power is supplied to control assembly 2 from charge station 7 or auxiliary power receptacle 13. From control assembly 2, power is supplied to coil assembly 102 through multiple strand harness 107. Flywheel 100 is rotated to a speed sufficient to propel the vehicle for the required length of travel and as indicated by power level meter 120. As the vehicle traverses the course of travel, flywheel assembly 1 furnishes power to motor 116 and then wheels 118. During the course of travel, power is depleted from flywheel assembly 1 and power level meter 120 indicates the level of power remaining. If the power level is reduced to the degree that vehicle propulsion is not possible, auxiliary power source 21 is employed to restore the system to an operating condition.

In the actual use of the golf cart propulsion system, the operator would position the vehicle on charge station 7 at the first tee and then engage pickup operator 5 thereby lowering pickups 6 to communicate with contact bars 9 causing an increase in rotational speed of flywheel 100. Elements of the propulsion system are sized to allow sufficient power storage during the interval of travel between tee boxes. The operator then proceeds to the green, stopping the vehicle along the way, as required. When the vehicle is stopped, flywheel 100 will only loose power due to frictional forces in the rotational mechanism, such as bearing friction and aerodynamic drag. The process if then repeated for the remaining holes.

Therefore, by this invention, a vehicle propulsion system is provided which is energy efficient and environmentally desirable.

The invention claimed is:

1. A vehicle propulsion system comprising a source of electrical power, a charge station electrically charged by said source, electrical pickups connected to said vehicle, said electrical pickups selectively engageable with said charge station, a flywheel assembly electrically interconnected to said electrical pickups, said flywheel assembly furnishing power to a motor, said motor propelling a plurality of vehicle wheels, said charge station comprising a ground pad, a pair of slots formed in said ground pad, each slot comprising an elongated generally U-shaped slot, said slot having a bottom, a contact bar disposed on said bottom for receiving said electrical pickups, a slot cover overlying the entirety of said slot, a resilient slit formed in said slot cover, said resilient slit comprising a pair of slit edges, and said slit edges being in abutting relation when said electrical pickups are not disposed within said slot.

2. The vehicle propulsion system according to claim 1 wherein said flywheel assembly comprises a flywheel, said flywheel assembly is interconnected to a combination magnet assembly and coil assembly.

3. The vehicle propulsion system according to claim 1 wherein said electrical pickups are lowered into engagement with said change station by means of a pickup operator.

\* \* \* \* \*